June 18, 1968     E. B. HALL     3,388,598
PRESSURE MEASURING DEVICE
Filed May 2, 1967     5 Sheets-Sheet 1
Fig. 1.
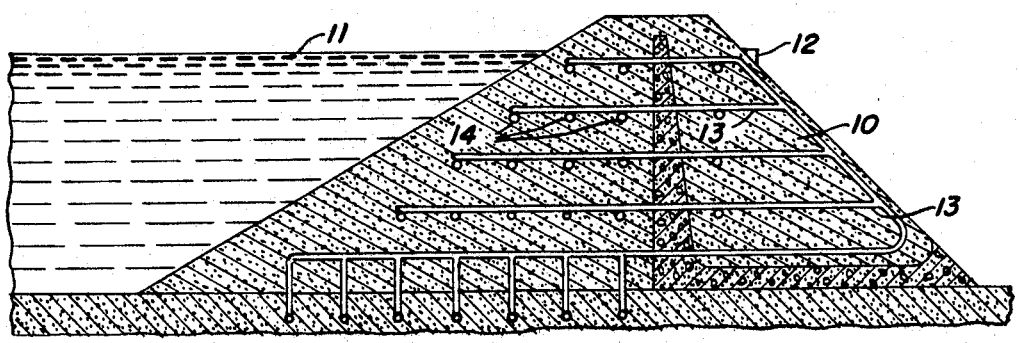
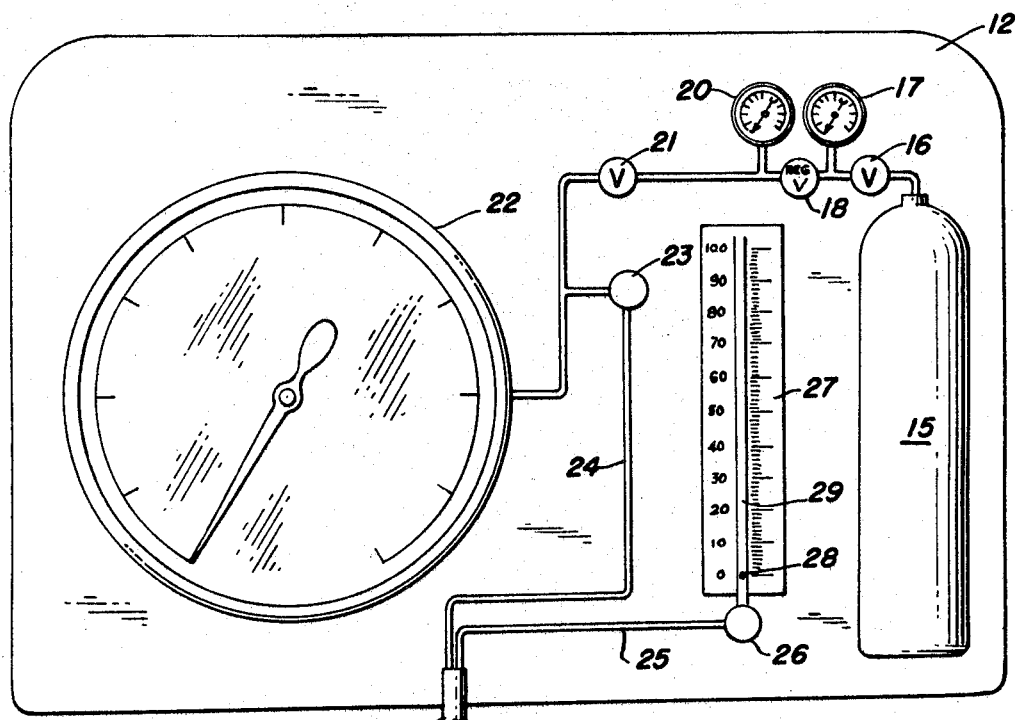
Fig. 2.
INVENTOR
EARL B. HALL
BY
Owen, Wickersham & Erickson
ATTORNEYS

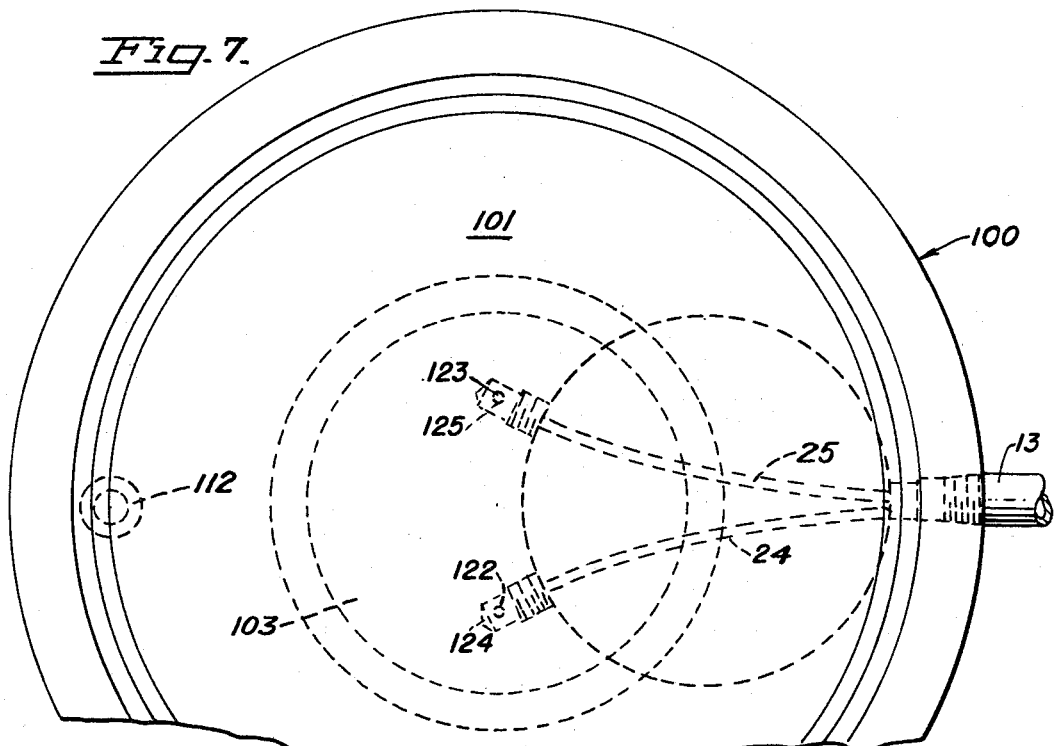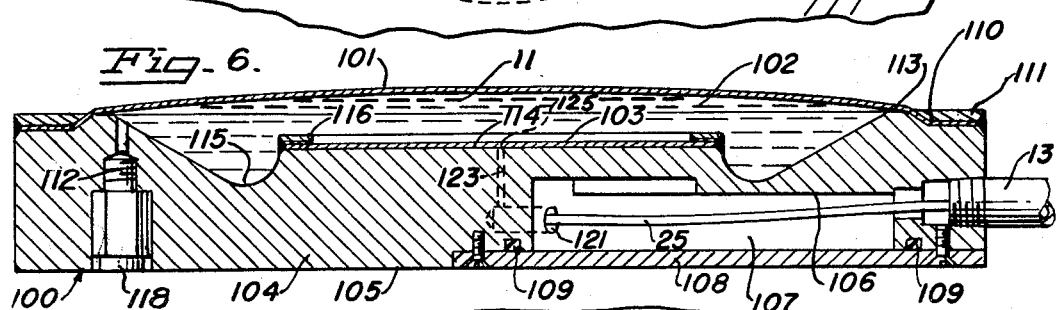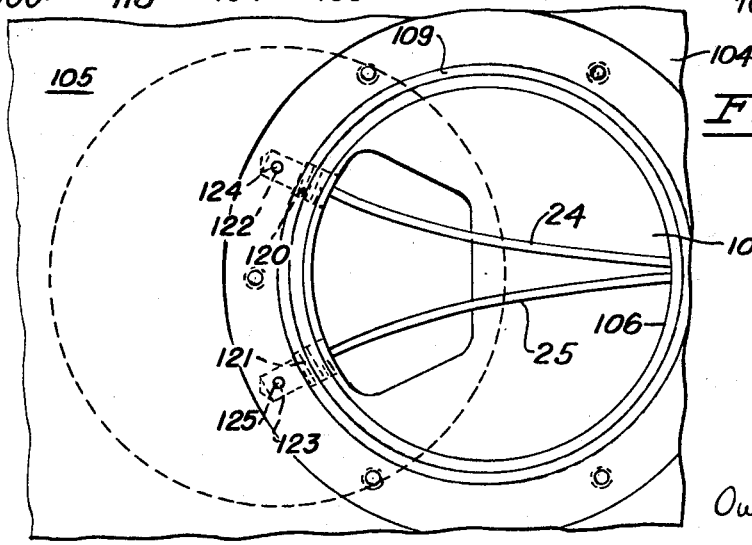

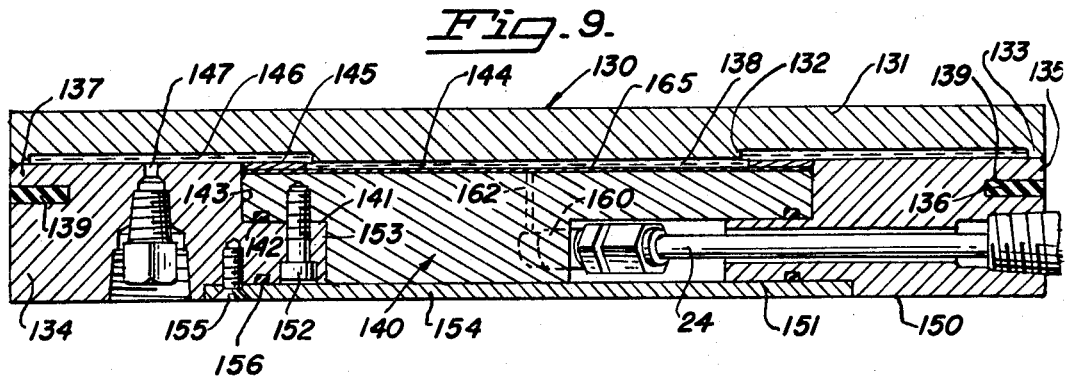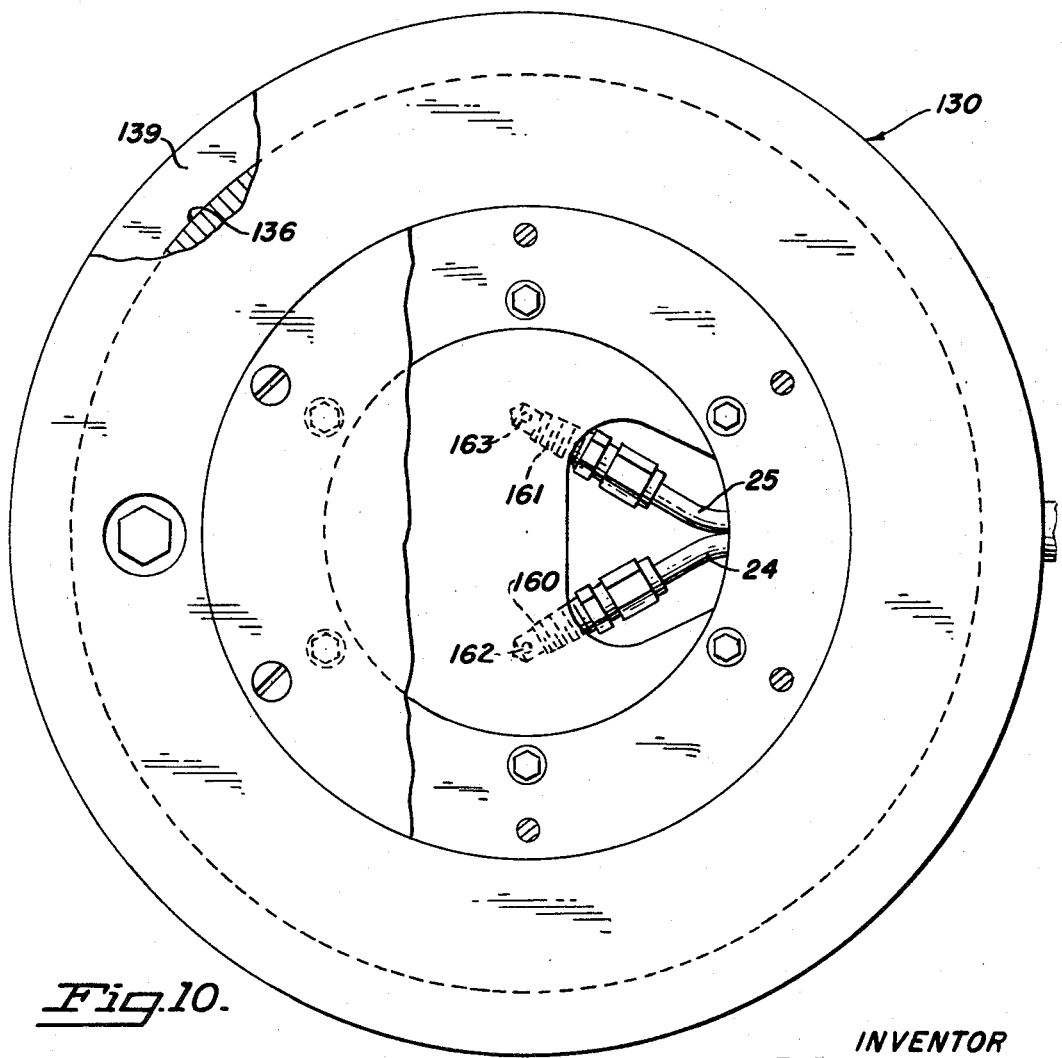

June 18, 1968 E. B. HALL 3,388,598
PRESSURE MEASURING DEVICE

Filed May 2, 1967 5 Sheets-Sheet 5

INVENTOR
EARL B. HALL
BY
Owen, Wickersham & Erickson
ATTORNEYS

United States Patent Office 3,388,598
Patented June 18, 1968

3,388,598
PRESSURE MEASURING DEVICE
Earl B. Hall, 163 Corte Ramon,
Greenbrae, Calif. 94901
Continuation-in-part of application Ser. No. 527,359,
Feb. 14, 1966. This application May 2, 1967, Ser.
No. 641,409
20 Claims. (Cl. 73—406)

ABSTRACT OF THE DISCLOSURE

This pressure measuring system has a pressure sensing cell with a bearing wall, into which two spaced-apart passages open. A diaphragm is normally seated against the bearing wall, being urged there by the pressure being sensed. Connected to the passages are an inlet conduit and an outlet conduit which lead to a terminal console for control of the cell and measurement of the sensed pressure. At the terminal console is a supply of gas under pressure greater than the sensed pressure and a valve for varying the flow rate and pressure of the gas supplied to the inlet conduit. A pressure gauge is also connected to the inlet conduit, and a gas flow meter is connected to the outlet from the outlet conduit, so that when gas from the supply passes through the inlet conduit to the diaphragm at pressure and amount sufficient to unseat the diaphragm a predetermined amount from the bearing wall, a predetermined flow rate will be indicated by the flow meter, and the pressure gauge then indicates the pressure against the diaphragm.

This application is a continuation-in-part of application Ser. No. 527,359, filed Feb. 14, 1966.

This invention relates to a pressure measuring device. More particularly, it relates to a pressure cell for measuring hydrostatic pressures within soil, total hydrostatic-and-soil pressures, and the like.

Engineers need to know the pressures involved in many types of situations, and the invention is directed to several of them, particularly pressures encountered underground, or in earth. For example, the pressures within an earth-filled dam are important, because by knowing these pressures the engineers are able to determine whether the dam is performing according to its design specifications or whether trouble is developing; if there is trouble, it can often be overcome or prevented by knowing the soil and hydrostatic pressure conditions ahead of time. Similarly, it is important to know the pressure conditions beneath foundations of buildings, tanks, bridges and many other structures, and the pressures beneath airport runways and highways, in roadway embankments and in earth fills across ravines and the like. Hydrostatic pressures are especially important wherever the earth is acting as a dam holding back water, because the seepage of water in the soil gives a resultant increase in hydrostatic pressure which can be a danger signal that, if noticed in time, can enable proper remedial action.

Such pressures have been difficult to measure because one cannot readily lower ordinary pressure measuring devices deep down into the earth, nor can ordinary pressure gauges give reliable readings in that environment. Also, the reading must ordinarily be done at a distant location, sometimes 1,000 to 5,000 feet from the sensing device.

Some attempts have been made to measure soil pressures, using various types of instruments, but heretofore none has been sufficiently reliable. or example, in some systems the measuring has depended upon hydraulic fluids, and these were often unsatisfactory, because, for example, the ambient temperature sometimes froze the hydraulic liquid or considerably changed its viscosity. The present invention avoids these problems by providing a pneumatic system.

The pressure devices of this invention enable the engineer to verify his design values and to become familiar with the factors involved so that on the next design he can come still closer to actual values. It enables better construction control, provides a performance history of a structure (particularly during the critical early life), and serves as an alarm system for internal distresses that might not otherwise be observed.

By using two similarly operated instruments of somewhat different construction, this invention makes it possible to measure both total pressures (earth pressure plus hydrostatic pressure) and the hydrostatic pressures alone at the same location. By mathematical computation, the intergranular or effective earth pressure can then be determined as well.

The devices can be installed quickly at relatively low cost without the necessity of defined grade. Leads can be made to grades available during construction or can be brought vertically out of the structure. A terminal station can be very simple, and few of them are required. The terminal stations need only protection from unauthorized entry and minimal protection from the weather.

The invention enables quite accurate pressure sensing, the basic limits being those of the measuring gauges themselves, and these are readily obtainable with an accuracy of one-quarter of one percent of full scale.

The invention is useful for pressure sensing in other environments and for other uses than those just described. Other objects and advantages of the invention will appear from the following description of some preferred embodiments thereof.

In the drawings:

FIG. 1 is a diagrammatic view in elevation and in section of a typical earth-fill dam in which an instrumentation system of the invention is installed.

FIG. 2 is a somewhat diagrammatic view in elevation of the system of the invention shown for a single measuring cell.

FIG. 6 is a view in elevation and in section of a total-pressure cell embodying the principles of the invention.

FIG. 7 is a top plan view of the cell of FIG. 6, with a portion broken off in order to conserve space.

FIG. 8 is a fragmentary bottom plan view of a portion of the cell of FIG. 6 with the bottom plate removed.

FIG. 9 is a view in elevation and in section of a modified form of a total pressure cell also embodying the principles of the invention.

FIG. 10 is a bottom plan view of the cell of FIG. 9, with a portion broken away to show a portion of the interior.

Figure 3:
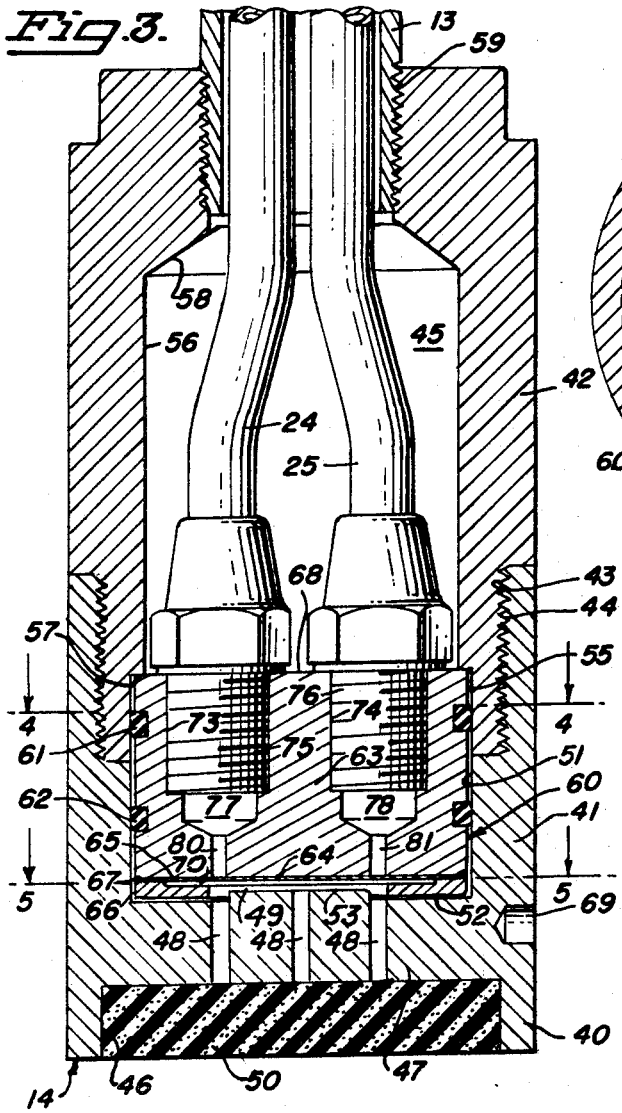
FIG. 3 is a view in elevation and in section of a hydrostatic pressure cell embodying the principles of the invention.
Figure 4:
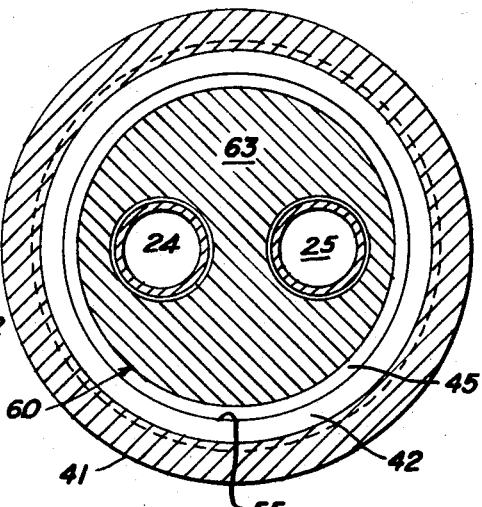
FIG. 4 is a view in section taken along the line 4—4 in FIG. 3.
Figure 5:
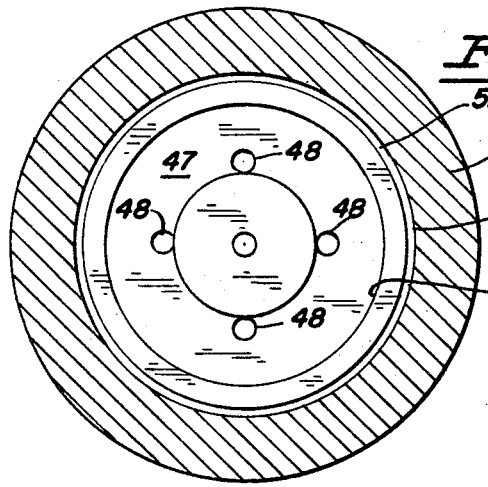
FIG. 5 is a view in section taken along the line 5—5 in FIG. 3.

A typical installation of the instrumentation of the invention is shown in FIG. 1. Here is an earth-fill dam 10 holding back a lake 11 of water. It is desired to know the hydrostatic pressures within the dam 10, i.e., the pressures exerted by water inside the earth, in order to tell whether the fluid pressure inside the dam 10 is becoming excessive and thereby tending to create a state of danger. It is also important to provide a performance history of the dam 10 and to verify the values which the engineer assumed when he was designing it.

The invention includes a terminal station or console 12, a series of conduits 13 and a large number of individual instruments 14 which may be called hydrostatic pressure cells. Holes may be drilled to locate these cells 14, or the cells 14 may be put in as the dam is being constructed, as shown herein. Each cell 14 is located in the earth at a desired location. From this point, the conduits 13, which may be about one-half inch in diameter, lead to the terminal 12.

As shown in FIG. 2 the terminal measuring console 12 incorporates a supply tank 15 of a suitable high-pressure gas, such as nitrogen, having a shut-off valve 16 and preferably a tank-pressure gauge 17. A pressure regulator 18 lowers the pressure to a desired value indicated by a pressure gauge 20 and sends the gas to a micrometering valve 21. On the downstream side of the micrometering valve 21 is a main pressure gauge 22 which will serve to indicate the gas pressure at the pressure cell 14. A quick-connect coupler 23 enables connection of any one of a series of conduits 24 thereto.

The conduit 13 contains at least two individual conduits 24 and 25 of smaller diameter and protects these smaller gas conduits 24 and 25 from damage. Thus, the outer conduit 13 may be of heavy polyethylene about a half-inch in diameter and may be covered by armor coating of flexible galvanized steel or flexible aluminum in turn preferably covered with a corrosion-resistant coating such as polyvinyl chloride. The inner conduits 24 and 25 may be of nylon and about one-eighth inch in diameter. The conduits 24 and 25 are preferably made without joints, as by continuous extrusion, and they can be as long as about 5,000 feet, this length being not critical.

The inlet conduit 24 leads to the measuring cell 14, and an outlet conduit 25 leads away from the cell 14 back to the console 12. Each pressure cell 14 has its own conduits 24 and 25, and there is no other cell 14 in parallel or series with it. A second quick-connect coupler 26 for the outlet conduit 25 cooperates with the coupler 23 to enable rapid changing at the console 12 between cells 14, so that a single console 12 can be used with many different cells 14.

Figure 11:
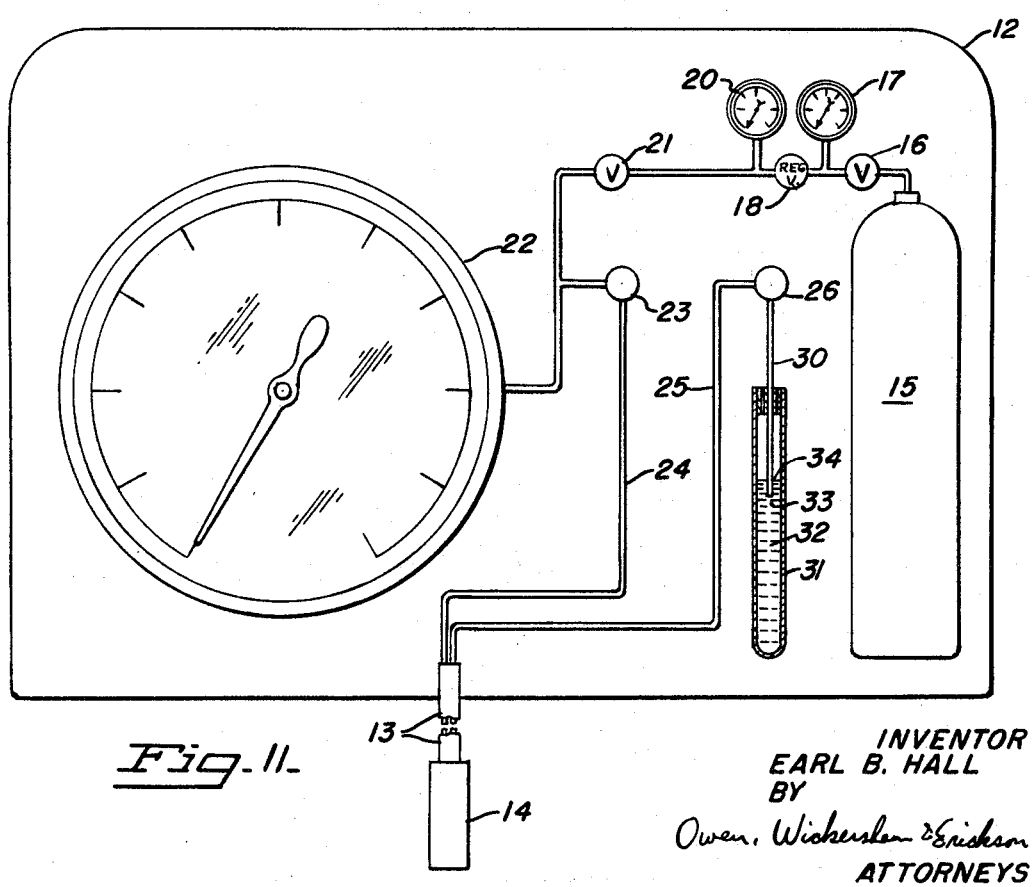
FIG. 11 is a view similar to FIG. 2 of a modified system like that of FIG. 2.

The coupler 26 is connected to a suitable flowmeter 27. For example, the flowmeter 27 may be of the float type, having a float ball 28 mounted in a gently divergent conical tube 29 open to the atmosphere at the top and with calibrations along the side. Instead of the float-type flowmeter 27, the flowmeter system of FIG. 11 may be used, in which a small tube 30 leads from the coupler 26 to a bubble-type detection tube 31, which is filled to a predetermined level with water 32, and the outlet 33 from the tube 30 is below the level 34 of the water 32.

The explanation of the exact operation will be gone into later, but basically it is one of sending a metered flow of gas under a regulated pressure from the tank 15 (via the regulator 18 and the micrometering valve 21) to the measuring cell 14. The hydrostatic pressure at the cell 14 is the pressure shown on the gauge 22 when the flowmeter 27 or a certain bubble rate in the detection tube 31 indicates a predetermined rate of flow of gas back from the cell 14 through the conduit 25. This operation after installation is quite simple.

A hydrostatic cell 14 of the invention is shown in FIGS. 3 to 6 and includes a housing 40 preferably made up of a base housing member 41 and an upper housing member 42. The base housing member 41 is preferably cylindrical, having at one end interior threads 43 to receive exterior threads 44 of the upper housing member 42. When the two members 41 and 42 are joined firmly together, they provide a chamber 45. At the end opposite the threads 43, the base 41 has a cylindrical receptacle 46 divided from the chamber 45 by a rigid partition 47, having a few passages 48 therethrough.

A filter 50, which may be made from ceramic or other non-metallic material, is cemented in the receptacle or recess 46 and serves to exclude particles larger than a certain predetermined size, and is in the order of microns in pore diameter. The filter 50 effectively excludes all soil particles and admits the liquid, and therefore enables exclusion of the intergranular soil pressure while measuring the hydrostatic pressure within the soil. The liquid flowing through the microporous filter 50 passes into the passages 48. The base housing 41 has a cylindrical bore 51 and the partition 47 has an end wall 52 with a raised central portion 53, there being a small chamber 49 above the end wall 52 and portion 53 enabling even application of the hydrostatic pressure.

The upper housing 42 has a wider inner cylindrical wall 55 and a narrower cylindrical wall 56 connected by a shoulder 57. At the far end of the wall 56 is a conical wall 58 leading to an interiorly threaded wall 59.

A sensing cell 60 fits within the chamber 45 opposite the end walls 52 and 53, being sealed by O-rings 61 and 62 in suitable grooves. The cell 60 comprises three members, a body 63 having an end wall 64, a metal diaphragm 65 and a protective chill ring 66. The diaphragm 65 and ring 66 are about the same diameter as the cylindrical body 63 and are welded to it at the periphery 67 to make the cell member 60 unitary. The diaphragm 65 may be stainless steel only one to five thousandths of an inch thick; it bears against the wall 64, which is preferably a flat bearing wall. The ring 66 faces the end wall 52 while the rear end 68 of the main body rests against the shoulder 57. The housing members 41 and 42 are tightened by applying a wrench to the opening 69, to secure the cell 60 in this rigid position.

The ring 66 has a counterbored recess 70 on its interior surface to enlarge the exposure of the diaphragm 65. Thus, the filter 50 enables passage of water at its hydrostatic pressure via the passages 48 and the chamber 49, facing the diaphragm 65. Thereby, the hydrostatic pressure in the soil is brought to bear against the diaphragm 65, and by measuring the hydrostatic pressure against the diaphragm 65, the hydrostatic pressure in the soil is measured.

The body 63 is provided with a pair of threaded inlets 73 and 74 which receive corresponding fittings 75 and 76 of the conduits 24 and 25, and therefore enable direct communication between a chamber 77 through the conduit 24 to the gauge 22 and direct communication from a chamber 78 through the conduit 25 to the flowmeter 27 (or the bubble tube 31). Passages 80 and 81 lead from the chambers 77 and 78 to the flat end wall 64, against which the stainless steel diaphragm 65 normally lies quite flat.

The pressure of the nitrogen gas from the tank 15, as said before, can be regulated by the regulator 18 and by the micrometering valve 21. To determine the hydrostatic pressure against the diaphragm 65, the regulator 18 is normally set to deliver a desired pressure somewhat above that to be measured, and the micrometering valve 21 is then used to vary the pressure over a narrow range, the pressure being indicated by the gauge 22. Usually the engineer has enough idea of the approximate value of the pressure he is to measure to enable him to set the regulator 18 and to secure initial adjustment of the micrometering valve 21. During measurement, he gradually opens the micrometering valve 21 and watches for signs of flow at the flowmeter 27 or tube 31. At first, there will be no flow at all because the hydrostatic pressure forces the diaphragm 65 snugly against the wall 64, and there is no passage of gas from the passage 80 to the passage 81. As the pressure increases, there will be a small flow, which preferably is disregarded as no more than indications that there is some loosening of the diaphragm 65. The point at which flow begins to appear is not important, since that depends partly upon the characteristics of the diaphragm 65 and the flatness of the wall 64 and so on. Each device is calibrated at the laboratory before being installed, so that the pressure indicated by the gauge 22 coincides with actual pressure on the diaphragm 65 at a chosen flow rate. The device may typically be calibrated for a flow of about 5 to 40 milliliters per minute, or in the FIG. 11 device for about two to five bubbles per second, which indicates that, at the chosen rate, the pressure against the diaphragm 65 is that shown on the gauge 22. The nitrogen gas passes from the floating-ball type of flowmeter 27 or the bubble-tube type of flowmeter 31 harmlessly to the atmosphere.

The hydrostatic pressure cell 14 is a simple, rugged, standard instrument, which is readily installed and which is durable and reliable and accurate. It can measure the hydrostatic pressure deep underground, in critical and otherwise inaccessible areas and serves as a kind of sentry for earth-fill dams and the like. The sensitivity of the stainless steel diaphragm 65 is such that pressures can be read far more accurately than the accuracy of the gauge 22 permits, even though accurate gauges be used. Water pressure on the diaphragm can be measured to the exclusion of pneumatic pressure by proper choice of the pore size of the filter 50; if it is desired to include pneumatic pressure in the pressure to be measured, a different pore size in the filter is used.

Typically, the unit 14 is not placed in direct contact with the soil; instead it is placed in a small pocket of sand, to prevent damage during construction and to prevent false reading due to sealing of the device by fine grained or clay material. In the sand pocket, the filter 50 is exposed to hydrostatic pressure, not to clay. Because the device is pneumatic, the leads 13 do not have to be placed on a controlled grade and may be brought out vertically. Moreover, the use of nitrogen gas avoids trapped air pockets in hydraulic leads, and it also avoids any possibility of freezing of the conduits 24 and 25.

An important point to consider is the use of the micrometering valve 21, which is set so that only a microscopic quantity of gas passes. This enables one to obtain a very delicate control. No reliance is made on high flow rates of gas to trigger something, but is made on observation of a rate which is quite readable by an operator.

Another important point is to keep the regulated pressure ahead of the micrometering valve 21 set at a value not reatly in excess of the pressure being sensed by the pressure cell 60. The initial setting becomes relatively easy, once the operator gets accustomed to it and particularly after initial records have been built of any particular location showing past pressures that have been experienced.

Instead of using one large gauge 22 it is, of course, possible to use sets of gauges with various pressure ranges and sensitivities.

FIGS. 6, 7 and 8 show a device 100 for reading total pressure, i.e., the sum of the hydrostatic pressure and the intergranular soil pressure. In this device 100 the unit is preferably made wider and flatter and is provided with an external convex diaphragm 101, preferably metal, which bears directly against the soil and replaces the filter 50. Covered by the diaphragm 101 is a chamber 102 filled with oil or other hydraulic fluid, which transmits the total pressure to a metal diaphragm 103 generally like the diaphragm 65 in structure and function, but usually larger in diameter. Otherwise, operation is the same as for the hydrostatic pressure cell 14, except there is no direct impingement of either water or soil against the diaphragm 103, and there is no discrimination between hydrostatic pressure in the soil and earth pressure.

To be specific, the unit 100 preferably has a main body 104 with a generally flat lower surface 105 and recess 106 in the lower surface to provide a chamber 107 when closed by a lower plate 108 and sealed by an O-ring 109. The body 104 has a flat upper rim 110 against which an outer margin of the diaphragm 101 rests, being welded to it and to a ring 111. The upper surface of the body 104 has a raised annular portion 113 to raise and support the diaphragm 101 and a central bearing portion 114, preferably flat, surrounded by a recessed portion 115. The diaphragm 103 is normally held flat against the flat surface 114 and is welded at its outer periphery to the body 104 and a ring 116. The resulting chamber 102 between the diaphragm 103 and 101 is filled with oil through a passage 112, which is then sealed by a plug 118. The oil in the chamber 102 transmits the total pressure against the outside of the diaphragm 101 to the outer side of the diaphragm 103.

The conduit 13 leads into the chamber 107, and the conduit 24 is attached to a fitting 120, while the conduit 25 is attached to a fitting 121. Passages 122 and 123, respectively, lead from the fittings 120 and 121 up to widely spaced openings 124 and 125 through the flat surface 114. In operation, the micrometering valve 21 sends gas to the opening 124 and when that gas pushes up the diaphragm 103 enough to communicate with the opening 125 sufficiently to produce a predetermined bubble rate in the tube 28, the gauge 22 indicates the total pressure.

Preferably, the diameter of the unit 100 and its diaphragm 101 is essentially larger in this type of device to give more accurate readings than a small device can give. By installing both types of cells 14 and 100 relatively close to each other it is possible to calculate the intergranular pressure, by subtracting the measured hydrostatic pressure from the measured total pressure.

FIGS. 9 and 10 show a modified form of total-pressure cell 130 having a flat external diaphragm 131. Preferably the diaphragm 131 is relatively thick metal having a thicker central portion 132 and a thicker edge rim 133 which is welded to a main body 134 at the periphery 135. The main body 134 is provided with a deep inset circumferential recess 136, substantially deeper than the width of the rim 133, so that pressure against the external diaphragm 131 is resolved by inward movement of the center thereof and not merely transmitted to the body 134. Thus, pressure transmitted through the rim 133 to the body 134 tends to flex an underlying body portion 137 relative to the body 134, resulting in a kind of doming of the diaphragm 131, very small in actual amounts but effective in transmitting pressure to hydraulic fluid 138 beneath the diaphragm 131. A material 139 such as sponge rubber, polyurethane foam, cork, or mastic fills the recess 136 to keep out rocks and assure the needed flexing of the portion 137.

Before the external diaphragm 131 is welded to the body 134, an inner cell 140 is inserted into a recess in the annular main body 134, resting on a shoulder 141, to which it is sealed by an O-ring 142, the periphery of the cell 140 fitting snugly in a wall 143. The inner cell 140 resembles the cell member 60 in many ways, except for size, and it is also similar in many ways to the members 104 of FIGS. 6–8. An internal diaphragm 144 is welded to a flat upper surface of the body of the cell 140, with the aid of a chill ring 145, the upper surface of which lies flush with the upper surface 146 of the body 134. The hydraulic fluid 138 thus lies between the two diaphragms 131 and 144, as well as between the diaphragm 131 and the shelf formed by the surfaces 146 and the chill ring 145. The fluid 138 is introduced through a normally closed port 147. The stepped portion 132 of the diaphragm 131 insures that the space between the two diaphragms 131 and 144 is substantially the same as that between the diaphragm 131 and the shelf 146 and chill ring 145; so the step is preferably located at that same distance from the chill ring 145. The two diaphragms 131 and 144 are concentric; so pressure against the outer diaphragm 131 is transmitted to the diaphragm 144 through the hydraulic fluid 138.

The annular body 134 is provided with a lower end wall 150 having a recessed shelf 151. Bolts 152 extend up through an annular body portion 153 to secure the inner cell 140 in place and to tighten the O-rings 142 into their sealing position. A cover plate 154 is held in place by machine screws 155, and they serve to compress O-rings 156 to seal this portion also.

Conduits 24 and 25 lead to chambers 160 and 161, which are connected by passages 162 and 163 to a flat surface 165 against which the diaphragm 144 normally rests. Operation is thus basically as that shown in FIG. 2, except that the cell 130 has the two diaphragms 131 and 144 to transmit the *total* pressure on the diaphragm 131, instead of hydrostatic pressure only.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A pressure measuring system, including in combination a pressure sensing cell having a body with a bearing wall and two spaced-apart passages opening into said bearing wall, and a diaphragm normally seated against said bearing wall and urged thereagainst by the pressure being sensed, a pair of conduits connected to said passages, comprising an inlet conduit and an outlet conduit, a terminal console for control of said cell and measurement of the sensed pressure, said terminal console being connected to said cell by said conduits and comprising a supply of gas under pressure enough greater than said sensed pressure to enable unseating said diaphragm and a flow of at least 5 milliliters of gas per minute through said passages, valve means for varying the flow and pressure of gas beyond itself, said valve means being connected between said supply and said inlet conduit, pressure indicating means connected to said inlet conduit to indicate the pressure applied to said inlet conduit, and a gas flowmeter of the floating-ball type connected to the outlet from said outlet conduit, so that when gas from said supply passes through said valve means and said inlet conduit to said diaphragm at pressure and amount sufficient to unseat said diaphragm a predetermined amount from said bearing wall, a predetermined flow rate between 5 and 40 milliliters per minute will be indicated by said flowmeter.

2. A pressure measuring system, including in combination a pressure sensing cell having a body with a bearing wall and two spaced-apart passages opening into said bearing wall, and a diaphragm normally seated against said bearing wall and urged thereagainst by the pressure being sensed, a pair of conduits connected to said passages, comprising an inlet conduit and an outlet conduit, a terminal console for control of said cell and measurement of the sensed pressure, said terminal console being connected to said cell by said conduits and comprising a supply of gas under pressure greater than said sensed pressure, valve means for varying the flow and pressure of gas beyond itself, said valve means being connected between said supply and said inlet conduit, pressure indicating means connected to said inlet conduit to indicate the pressure applied to said inlet conduit, and a gas flowmeter connected to the outlet from said outlet conduit, so that when gas from said supply passes through said valve means and said inlet conduit to said diaphragm at pressure and amount sufficient to unseat said diaphragm a predetermined amount from said bearing wall, a predetermined flow rate will be indicated by said flowmeter, said inlet and outlet conduits being provided at said terminal console with quick-connect couplers to said valve means and said outlet, respectively, enabling a whole series of cells to be successively connected, one at a time, to said valve means and outlet.

3. A pressure measuring system, including in combination a pressure sensing cell having a body with a bearing wall and two spaced-apart passages opening into said bearing wall and a diaphragm normally seated against said bearing wall and urged thereagainst by the pressure being sensed, said sensing cell comprising a diaphragm chamber on the opposite side of said diaphragm from said bearing wall, and a second diaphragm closing said diaphragm chamber and preventing contact of any material outside said sensing cell with the first-named said diaphragm, and transmitting means filling said diaphragm chamber and transmitting the total pressure applied to said second diaphragm, a pair of conduits connected to said passages, comprising an inlet conduit and an outlet conduit, a terminal console for control of said cell and measurement of the sensed pressure, said terminal console being connected to said cell by said conduits and comprising a supply of gas under pressure greater than said sensed pressure, valve means for varying the flow and pressure of gas beyond itself, said valve means being connected between said supply and said inlet conduit, pressure indicating means connected to said inlet conduit to indicate the pressure applied to said inlet conduit, and a gas flowmeter connected to the outlet from said outlet conduit, so that when gas from said supply passes through said valve means and said inlet conduit to said diaphragm at pressure and amount sufficient to unseat said diaphragm a predetermined amount from said bearing wall, a predetermined flow rate will be indicated by said flowmeter.

4. A pressure measuring system, including in combination a pressure sensing cell having a body with a flat wall and two spaced-apart passages opening into said flat wall, and a diaphragm normally seated against said flat wall and urged thereagainst by the pressure being sensed, a pair of conduits connected to said passages, comprising an inlet conduit and an outlet conduit, and a terminal console for control of said cell and measurement of the sensed pressure, said terminal console being connected to said cell by said conduits and comprising a supply of gas under pressure greater than said sensed pressure, means for regulating said pressure to a value still above but relatively close to the sensed pressure, said value enabling a flow of 5 to 40 milliliters of gas per minute through said passages, a micrometering valve for varying the flow and consequently the pressure of gas beyond itself, said micrometering valve being connected between said regulator and said inlet conduit, a gauge connected to said micrometering valve and said inlet conduit to indicate the pressure applied to said inlet conduit, and a gas flowmeter connected to the outlet from said outlet conduit, so that when gas from said supply passes through said regulator, said micrometering valve, and said inlet conduit to said diaphragm at pressure and amount sufficient to unseat said diaphragm a predetermined amount from said flat wall, a predetermined flow rate between 5 and 40 milliliters per minute will be indicated by said flowmeter.

5. A pressure measuring system, including in combination a pressure sensing cell having a body with a flat wall and two spaced-apart passages opening into said flat wall, and a diaphragm normally seated against said flat wall and urged thereagainst by the pressure being sensed, a pair of conduits connected to said passages, comprising an inlet conduit and an outlet conduit, and a terminal console for control of said cell and measurement of the sensed pressure, said terminal console being connected to said cell by said conduits and comprising a supply of gas under pressure greater than said sensed pressure, means for regulating said pressure to a value still above but relatively close to the sensed pressure, a micrometering valve for varying the flow and consequently the pressure of gas beyond itself, said micrometering valve being connected between said regulator and said inlet conduit, a gauge connected to said micrometering valve and said inlet conduit to indicate the pressure applied to said inlet conduit, and a gas flowmeter connected to the outlet from said outlet conduit, so that when gas from said supply passes through said regulator said micrometering valve, and said inlet conduit to said diaphragm at pressure and amount sufficient to unseat said diaphragm a predetermined amount from said flat wall, a predetermined flow rate will be indicated by said flowmeter, said inlet and outlet conduits being connected at said terminal console by quick-connect couplers enabling a whole series of cells to be successively connected, one at a time, to said terminal console.

6. The system of claim 5 wherein said inlet and outlet conduits comprise constant-diameter extruded conduits without a joint or juncture from said cell to said couplers.

7. A pressure measuring system, including in combination a pressure sensing cell having a body with a flat wall and two spaced-apart passages opening into said flat wall, and a diaphragm normally seated against said flat wall and urged thereagainst by the pressure being sensed, said sensing cell comprising a diaphragm chamber on the opposite side of said diaphragm from said flat wall, and a second diaphragm closing said diaphragm chamber and protecting the first-named said diaphragm from contact with the material through which the pressure is being applied, and transmitting liquid filling said diaphragm chamber and transmitting the total pressure applied to said second diaphragm, a pair of conduits connected to said passages, comprising an inlet conduit and an outlet conduit, and a terminal console for control of said cell and measurement of the sensed pressure, said terminal console being connected to said cell by said conduits and comprising a supply of gas under pressure greater than said sensed pressure, means for regulating said pressure to a value still above but relatively close to the sensed pressure, a micrometering valve for varying the flow and consequently the pressure of gas beyond itself, said micrometering valve being connected between said regulator and said inlet conduit, a gauge connected to said micrometering valve and said inlet conduit to indicate the pressure applied to said inlet conduit, and a gas flowmeter connected to the outlet from said outlet conduit, so that when gas from said supply passes through said regulator, said micrometering valve, and said inlet conduit to said diaphragm at pressure and amount sufficient to unseat said diaphragm a predetermined amount from said flat wall, a predetermined flow rate will be indicated by said flowmeter.

8. The system of claim 7 wherein said second diaphragm is convex.

9. The system of claim 7 wherein said second diaphragm is flat, said system having a body member to which said diaphragm is secured around its periphery, said body member having a circumferential recess extending in radially beyond the bearing surface where the second diaphragm bears on the body member.

10. A hydrostatic pressure cell including in combination:
a rigid outer housing divided by a rigid partition into a filter receptacle open to the outside and an enclosed chamber, said partition having passage means therethrough,
filter means in said receptacle for excluding solid particles and passing fluids and thereby their hydrostatic pressure from outside said housing into said chamber,
a rigid body in said chamber having an end wall facing said partition, said body also having inlet means leading from one side of said wall to outside said housing and outlet means leading outside said housing from another side of said wall distant from said inlet, and
a metal diaphragm secured around its rim to said body and normally lying snugly against said end wall and urged tightly there by the hydrostatic pressure of fluid passing through said filter means, said diaphragm being actuatable by pneumatic pressure applied through said inlet means in an amount sufficient to overcome said hydrostatic pressure of fluid passing through the filter means and said partition passage means to flex said diaphragm away from said end wall sufficient to enable gas to pass from said inlet means to said outlet means.

11. The cell of claim 10 wherein said filter means is provided with pores that eliminate gas passage and pass water.

12. A hydrostatic pressure cell including in combination:
a rigid outer housing divided by a rigid partition into an open-end filter receptacle and an enclosed chamber, said partition having a plurality of passages therethrough,
a filter in said receptacle for excluding solid particles and passing fluids and thereby their hydrostatic pressure,
a rigid inner housing fitting snugly in said chamber and having an end ring facing said partition and said enclosed chamber, said inner housing also having an internal flat wall, said inner housing also having an inlet passage leading to one side of said flat wall and an outlet passage leading from another side of said flat wall distant from said inlet passage,
a metal diaphragm in said inner housing secured around its rim and normally lying flat snugly against said flat wall and urged tightly there by the hydrostatic pressure of fluid passing through said filter, said diaphragm being actuatable by pneumatic pressure applied through said inlet passage in an amount sufficient to overcome said hydrostatic pressure of fluid passing through the filter and said partition passages into said enclosed chamber, to flex said diaphragm away from said flat wall sufficient to enable gas to pass from said inlet passage to said outlet passage, and
a pair of pneumatic conduits, one connected to said inlet passage and the other to said outlet passage.

13. The cell of claim 12 wherein said filter is microporous and nonmetallic and is cemented in said receptacle.

14. A total pressure cell including in combination:
a rigid body having an upper outer rim, a central bearing wall, inlet means opening into said wall leading outside said cell and outlet means spaced from said inlet passage and also opening into said bearing wall and leading outside said cell,
an outer diaphragm with its outer margin secured to said rim and enclosing with said body a diaphragm chamber over and around said bearing wall,
pressure-transmitting means inside said diaphragm chamber, and
a metal diaphragm secured around its periphery to said body and normally lying snugly against said bearing wall and urged snugly against said bearing wall by the pressure of said pressure-transmitting means and actuatable by pneumatic pressure from said inlet means in amount sufficient to overcome the pressure of said pressure-transmitting means to move away from said bearing wall sufficient to enable gas to pass from said inlet means to said outlet means.

15. The cell of claim 14 wherein said central bearing wall is flat, said metal diaphragm is flat, and said outer diaphragm is convex.

16. The cell of claim 14 having a pair of pneumatic conduits, one connected to said inlet means and one to said outlet means.

17. A total pressure cell including in combination:
an annular rigid body having a central opening with a recessed upper shelf,
an inner cell body having a central flat wall, an inlet passage opening into said flat wall and an outlet passage spaced from said inlet passage and also opening into said flat wall,
an outer flat metal diaphragm with a depending outer margin secured to said rigid body and enclosing with said rigid body and said inner cell body a diaphragm chamber over and around said flat wall,
a pressure-transmitting liquid filling said diaphragm chamber,
a circumferential recess around rigid body adjacent to said outer margin and deeper than the width of said margin, and
an inner metal diaphragm secured around its rim to said inner cell body and normally lying flat against said flat wall and urged snugly against said flat wall by the pressure of said liquid in said diaphragm chamber and actuatable by pneumatic pressure from said inlet passage in amount sufficient to overcome the diaphragm chamber pressure to move said metal diaphragm away from said flat wall sufficient to enable gas to pass from said inlet passage to said outlet passage.

18. The cell of claim 17 having a pair of pneumatic conduits, one connected to said inlet passage and the other to said outlet passage.

19. The cell of claim 17 wherein said inner diaphragm lies a given amount below the level of the wall of the rigid body to which said outer diaphragm is secured, said outer diaphram being stepped an equal amount down opposite said inner diaphragm.

20. The cell of claim 17 wherein said recess is filled with material to avoid entry of rigid foreign matter, said material enabling flexing of the body portion between said recess and said outer diaphragm.

References Cited
UNITED STATES PATENTS

| | | | |
|---|---|---|---|
| 2,284,707 | 6/1942 | Wilson | 73—395 XR |
| 2,360,886 | 10/1944 | Osterberg | 73—398 |
| 2,645,128 | 7/1953 | Walker et al. | 73—388 |
| 3,259,054 | 7/1966 | Vanzo et al. | 73—209 XR |

DAVID SCHONBERG, *Primary Examiner.*

D. O. WOODIEL, *Assistant Examiner.*